Figure 5:
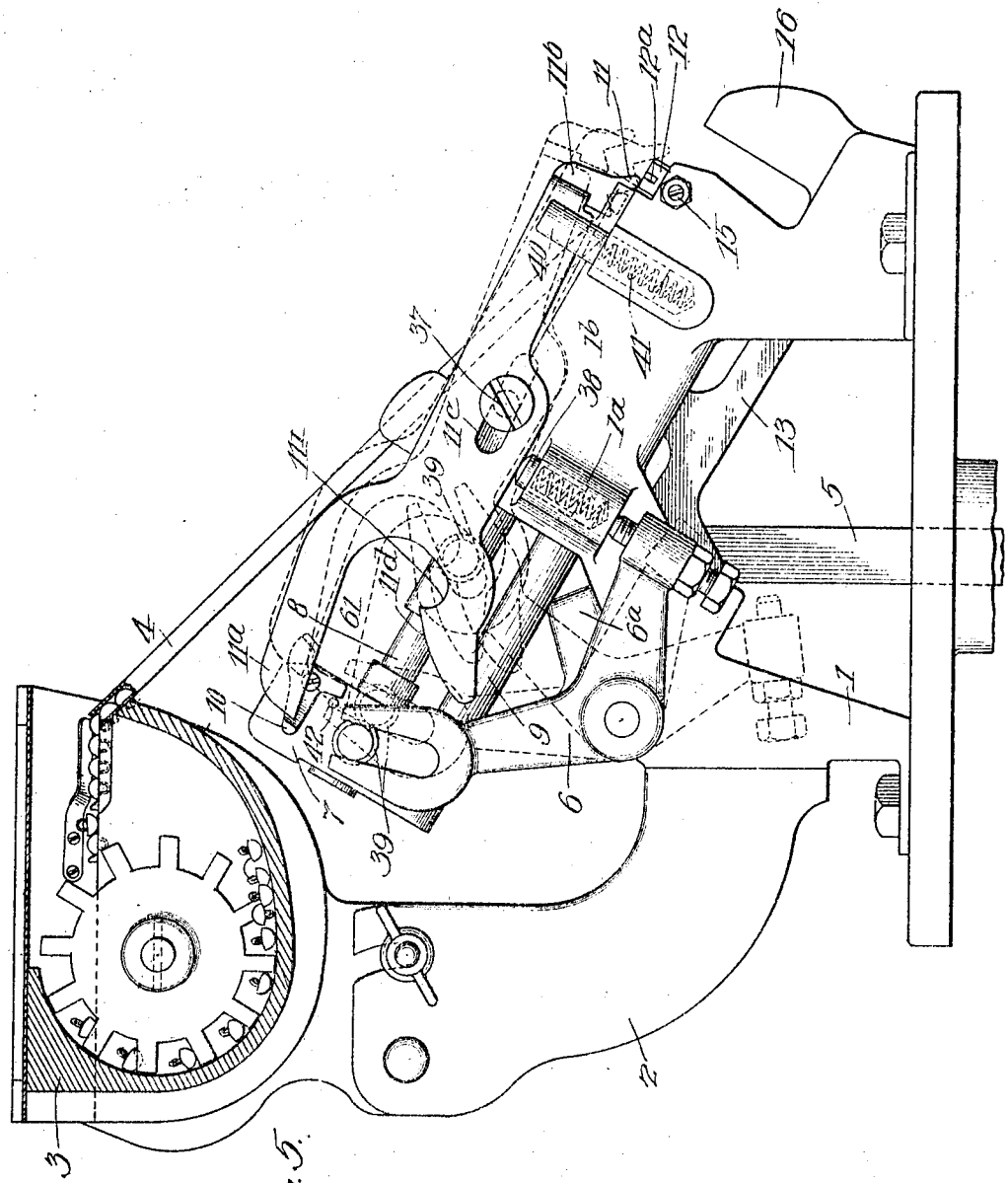

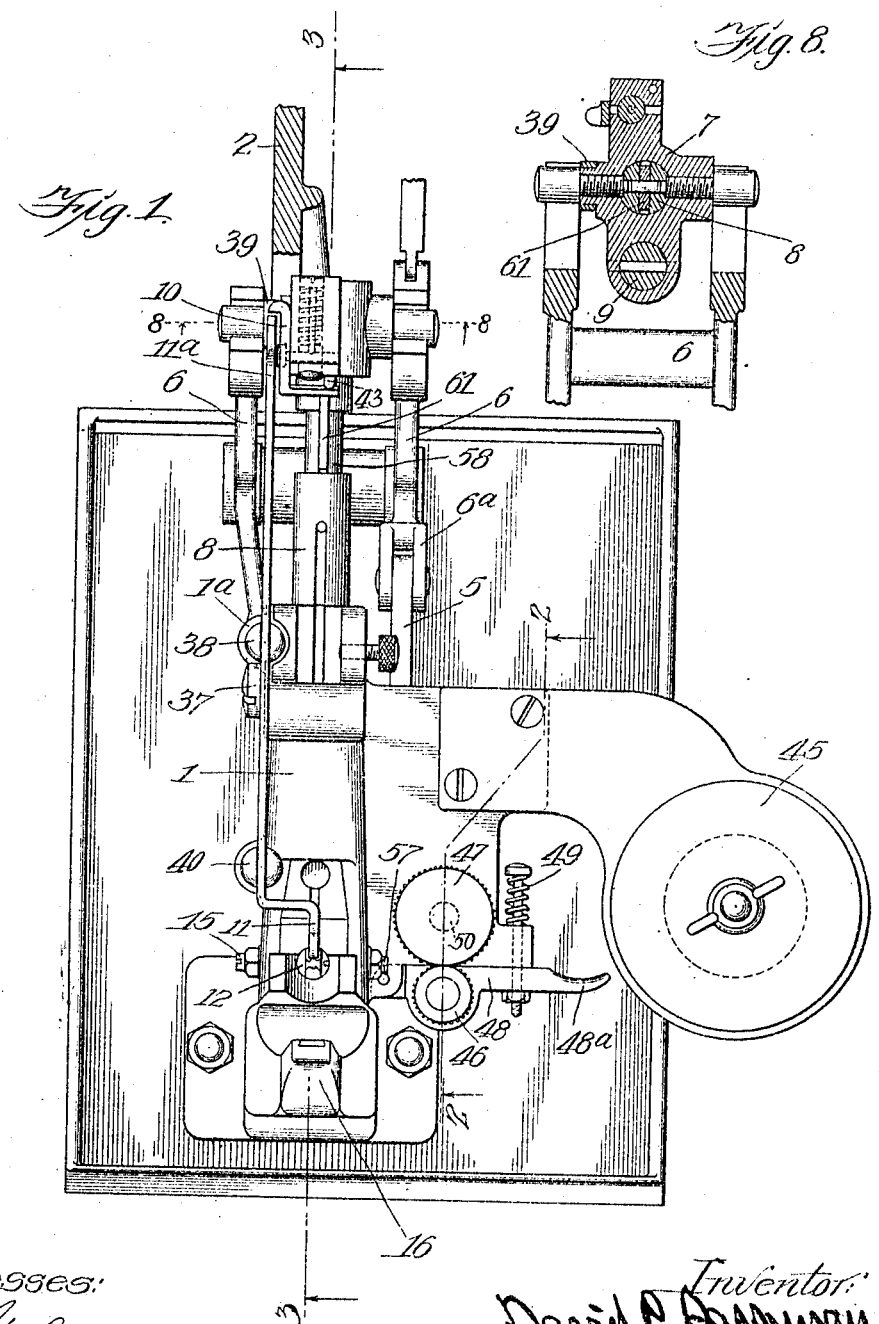

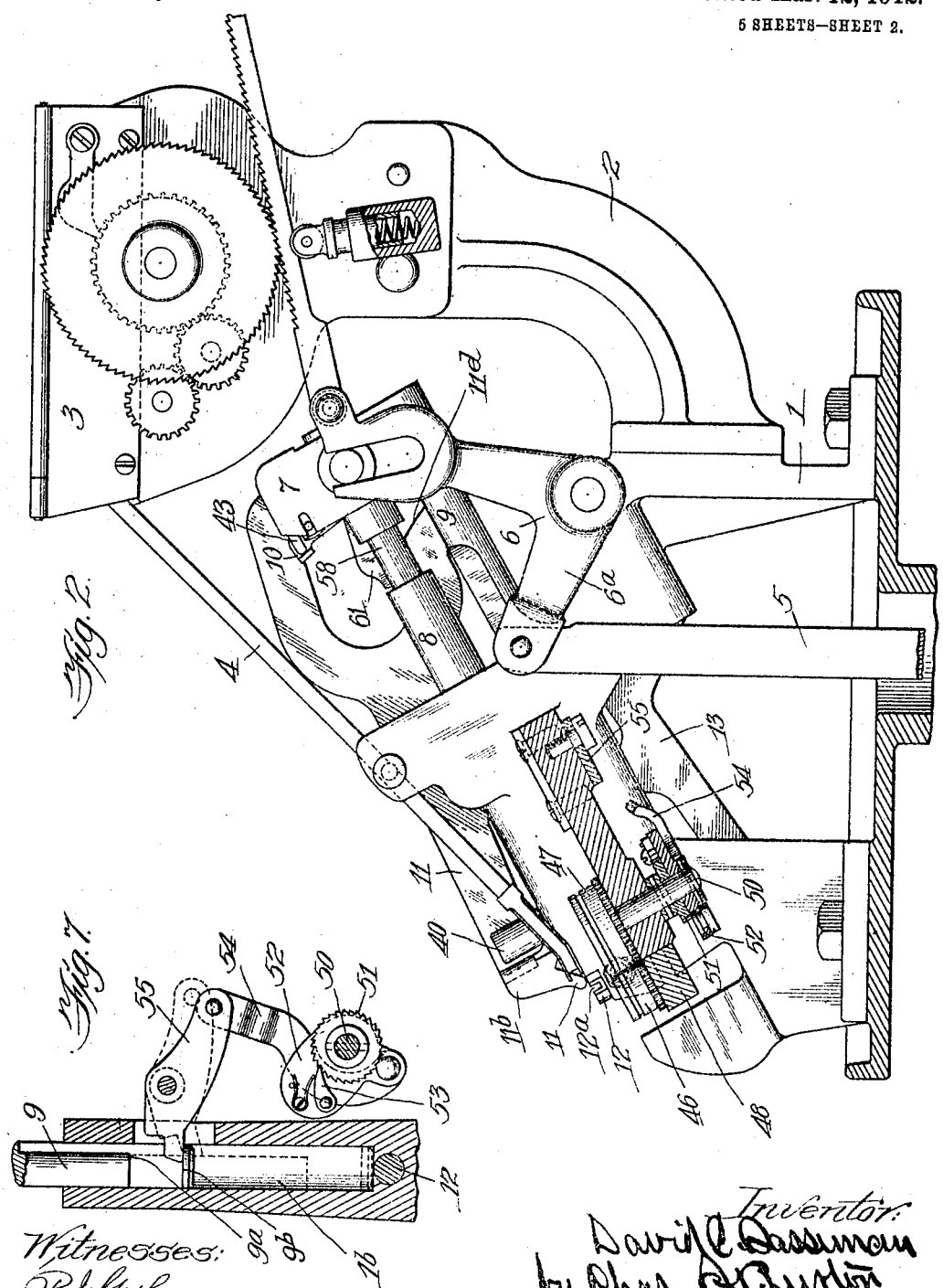

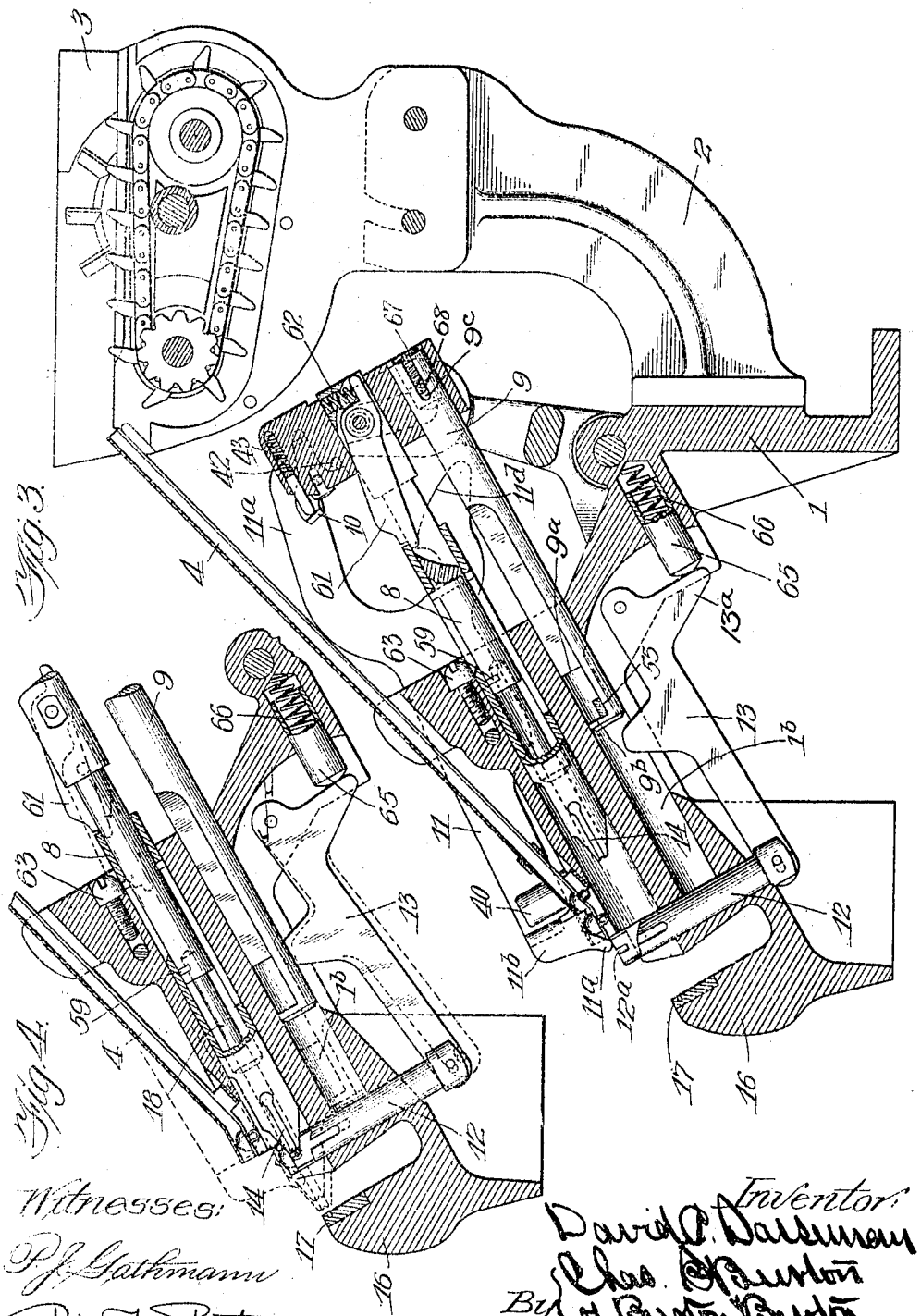

D. C. SASSEMAN.
BUTTON SETTING MACHINE.
APPLICATION FILED OCT. 15, 1910.

1,020,058.

Patented Mar. 12, 1912.
5 SHEETS—SHEET 4.

Witnesses:
P. J. Gathmann
Robt. K. Burton

Inventor:
David C. Sasseman
by Chas. K. Burton
By Burton & Burton
his Attorneys

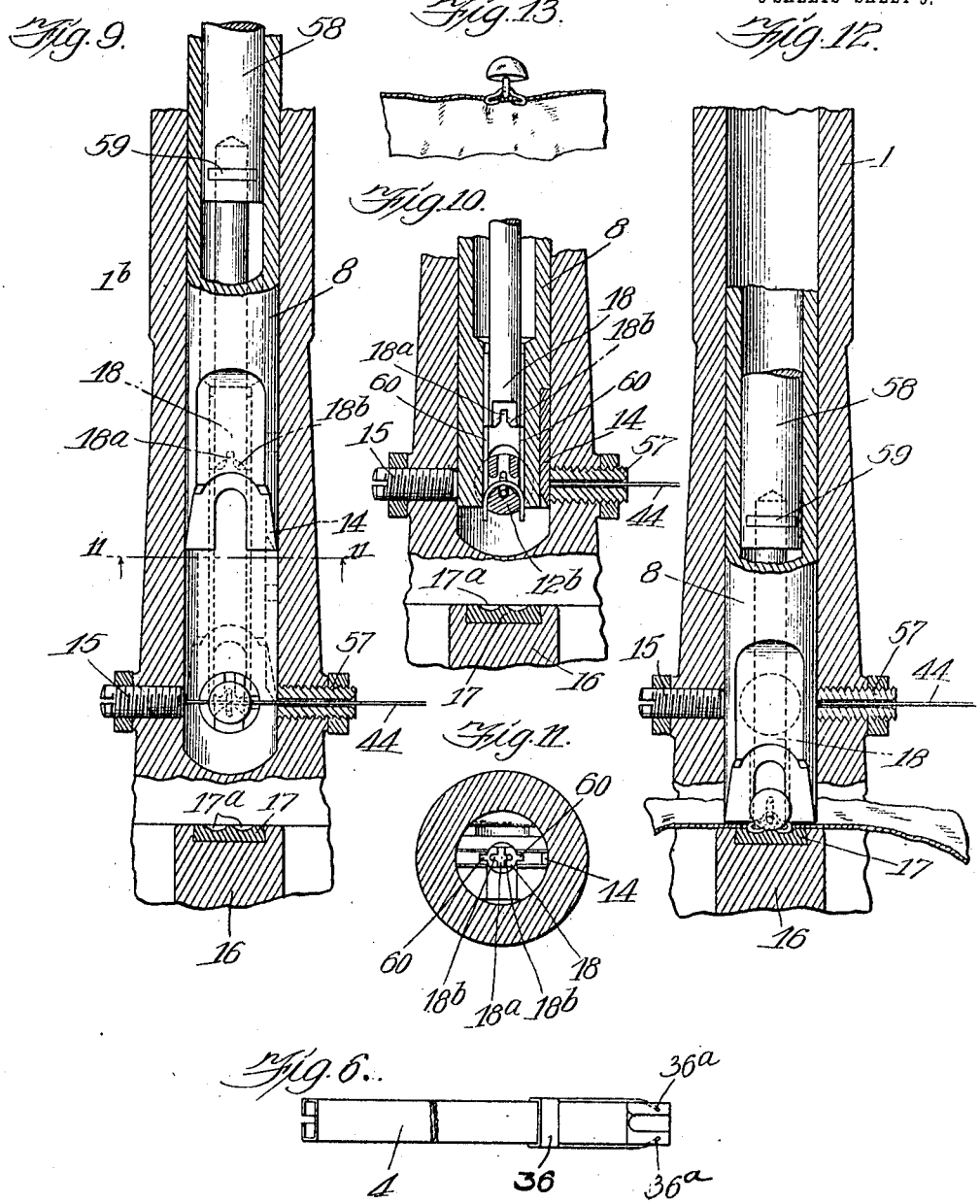

UNITED STATES PATENT OFFICE.

DAVID C. SASSEMAN, OF RIVER FOREST, ILLINOIS, ASSIGNOR TO F. H. SMITH MANUFACTURING COMPANY, OF CHICAGO, ILLINOIS, A CORPORATION OF ILLINOIS.

BUTTON-SETTING MACHINE.

1,020,058.   Specification of Letters Patent.   Patented Mar. 12, 1912.

Application filed October 15, 1910. Serial No. 587,159.

*To all whom it may concern:*

Be it known that I, DAVID C. SASSEMAN, a citizen of the United States, residing at River Forest, in the county of Cook and State of Illinois, have invented certain new and useful Improvements in Button-Setting Machines, of which the following is a specification, reference being had to the drawings forming a part thereof.

The purpose of this invention is to provide an improved mechanism for attaching buttons to fabrics on which they are required, being particularly intended for use with buttons having protruding eyes, such as shoe buttons, which are secured to the cloth or leather by means of wire staples.

It consists of the feature and elements herein described and shown in the drawings as indicated in the claims.

In the drawings:—Figure 1 is a plan view of the machine, the hopper being removed; Fig. 2 is a side elevation of the machine, section being made at the line 2—2 on Fig. 1; Fig. 3 is a sectional elevation, section being made at the line 3—3 on Fig. 1; Fig. 4 is a detail section similar to Fig. 3, showing the parts in operative position; Fig. 5 is an elevation of the other side than that shown in Fig. 2; Fig. 6 is a detail of the spring detent at the lower end of the chute; Fig. 7 is a detail of the wire-feeding mechanism; Fig. 8 is a detail of the bell-crank and cross-head shown in Fig. 2; Fig. 9 is a detail showing two positions of the plunger; Fig. 10 is a detail section showing the staple formed and in position for driving; Fig. 11 is a section at the line 11—11 on Fig. 9; Fig. 12 is a detail section showing the staple driven home through the leather and clenched; Fig. 13 illustrates a button fastened to the fabric by the machine.

A brief account of the operation of the machine will first be given, to be followed by a more detailed description of the various parts of the mechanism.

Secured to the rear side of the main frame, 1, is a bracket, 2, supporting the hopper, 3, in which the buttons ready for attaching are contained and from which they are fed by a mechanism not herein described into the chute, 4, descending by gravity through said chute to its lower end. Upon the retraction downward of the link-bar, 5, shown in Fig. 1, which connects the arm, 6$^a$, of the bell-crank, 6, with a treadle or other source of operating power, motion is communicated to a cross-head, 7, to which are connected plungers, 8 and 9. At the same time, the small trip-stop, 10, mounted on the cross-head engages the upper fork, 11$^a$, of the controller arm, 11. The notched end, 11$^b$, of said controller arm being already in possession of a button as the result of previous action now moves the button forward onto the notched head of the holder, 12, the eye of the button registering with the cross slot, 12$^a$, of the holder. As can be seen from Figs. 3 and 4, the further movement of the cross-head causes the plunger, 9, to collide with the upstanding portion of the lever, 13, thus depressing the holder, 12, upon which the button rests. The staple wire is now fed through the eye of the button by means hereinafter described, and with the advance of the plunger, 8, is cut off by the shear, 14, carried on the plunger, the length of wire cut off being gaged by the stop, 15. The bifurcated end of the plunger, 8, now presses the wire into the form of a staple, around the projection 12$^b$, of the holder, 12, then, depressing said holder away from the staple, carries the button with the staple forward toward the anvil, 16. The cloth or leather to which the button is to be fastened being held against the anvil, the staple is driven through it and clenched by engagement with the grooves, 17$^a$, properly formed in the anvil block, 17, for this purpose. The hammer member, 18, of the plunger, 8, is shaped for bending the staple more closely over the eye of the button and for flattening its side toward its clenched ends, as is shown in Fig. 12. This completes the working operation, and the parts of the machine are retracted to their original positions by a spring or counterweight connected with the treadle and not shown in the drawings.

In the description of details, the button-feeding mechanism contained within the hopper, 3, will not be further described, inasmuch as this mechanism, though shown in detail in the drawings, has been made the subject of a divisional application, Serial No. 601,583, filed January 9, 1911, and is therein completely described.

The buttons having been delivered to the chute, 4, from the hopper, descend therein by gravity and are prevented from escaping at the lower end by a spring detent 36 clasped around the chute and having fingers, 36ª, projecting laterally into the chute just ahead of the lowest button, but which are snapped apart by said button as it is carried forward under the controller arm, 11.

In its initial position,—that is, before any movement of the cross-head, 7,—the controller arm, 11, stands with its notched end 11ᵇ, resting upon a button at the bottom of the chute, as shown in Figs. 3 and 5. Its first movement, as previously explained, is parallel with that of the cross-head, 7, being communicated therefrom by the trip-stop, 10, and directed by the slot 11ᶜ, through which the arm is fulcrumed to the frame upon the stud, 37. At the limit of travel allowed by the slot, the button is brought to position on the head of the holder 12. The latter is then retracted downward by the plunger 9 and intermediate connection as above described. Under the influence of a spring-pressed plunger, 38, set in a boss, 1ª of the frame, the lower end of the arm 11 follows the holder downward, while the other end tilts upward out of engagement with the trip stop, 10. The controller arm now remains in contact with the holder until the roller, 39, on the cross-head strikes the cam edge, 11ᵈ, of the lower fork, depressing the latter, thus rocking the arm about the pivot-stud, 37, and raising its lower end off the button which, by this time, is in the control of the hammer-plunger. Passing the highest point of the cam edge, 11ᵈ, the roller, 39, snaps into the hollow, 11ᶠ, just at the finish of the cross-head stroke. On its return, the cross-head draws the arm, 11, back with it as far as the length of the slot, 11ᶜ, will allow, and then depresses it while the roller, 39, rides over the high point of the cam, 11ᵈ. When the roller has passed, the notched end, 11ᵇ, of the arm drops down over the next button to be moved from the chute onto the holder.

A slotted guide post, 40, preserves proper alinement of the arm, 11, and a cushioned spring, 41, contained therein eases the descent of the arm to prevent any marring of the buttons.

The trip-stop, 10, in order that it may pass the lower edge of the fork, 11ª, during the last part of the cross-head stroke is pivotally mounted on the cross-head and held in operative position against a pin stop, 42, by a light spring and plunger combination, 43. At the end of the stroke, the trip-stop snaps into position for driving the arm, 11, forward again. This completes the cycle of operation as it affects the controller arm.

As already stated, the wire staples used for attaching the buttons are formed by the machine, the wire, 44, from which they are to be made, being carried on a reel, 45, secured to the main frame. The loose end of the wire passes between grooved rolls, 46 and 47, by which it is fed through the holder, 12. The idler roll, 46, is mounted on a movable carrier, 48, yieldingly held toward the other roll by a spring, 49, the handle, 48ª, being provided for separating the rolls and inserting the wire. The driving roll, 47, is fast on a short shaft, 50, on which is also mounted the ratchet wheel, 51. A ratchet-plate, 52, carrying the ratchet-dog, 53, is pivoted upon the shaft just below the wheel, 51, and connected by a link, 54, to one end of the trip lever, 55. The other end of this lever projects into a cylinder, 1ᵇ of the main frame, in the path of the plunger, 9, which is formed at 9ª, for engaging it and actuating the ratchet train at the proper time for feeding the wire through the holder, 12. A small bushing, 57, and a stop, 15, are positioned at the level of the holder slot, 12ª, and adjustably secured by lock nut to properly locate the wire.

The action of the forked end of the plunger, 8, in bending the wire into a staple has already been described. Mounted for sliding within the plunger, 8, is a second plunger, 58, in the end of which is lodged the hammer rod, 18, secured by a key, 59. The bifurcated end of the plunger, 8, is bored out substantially the diameter of the hammer rod and grooved for the feathers, 60, carried by the rod. These grooves also aid in shaping the staple, as previously explained. The upper end of the plunger, 58, is slotted to contain a dog, 61, which at the beginning of the stroke is yieldingly upheld by a sprig, 62, in position to engage and drive the larger plunger, 8. In passing the round-headed screw, 63, the dog, 61, is depressed by contact therewith out of engagement with the large plunger, permitting the smaller one to telescope into it with the advance of the cross-head. Thus the hammer-rod, 18, is driven down upon the staple which has been carried to the anvil by the outer plunger, 8, all ready for driving. The driving head of the rod, 18, is slotted at 18ª, vertically so as to clear the eye of the button, as will be understood from Figs. 10 and 12. It is also provided with a horizontal semicircular slot, 18ᵇ, which engages the staple for driving it and shaping it close around the wire of the button eye. The remaining surface of the driving head serves in flattening and clenching the staple, as already described and as illustrated in Fig. 12.

As above noted, the return of the cross-head is accomplished by means of a spring or counterweight connected with the treadle and not shown in the drawings. To return the holder 12 to its button-receiving position, the plunger 65 slidably carried in the frame and yieldingly supported by a spring 66 is provided, engaging a downwardly extending portion 13ª of the lever 13. The ratchet dog of the wire feeding mechanism is brought back to driving position by encounter of the shoulder 9^b of the plunger 9 with the lever 55, with the result that at the end of the return stroke of the plunger, this trip lever will always stand abutting the shoulder 9^b. The point at which this stroke shall end may be varied by adjustment of the screw 67 in the upper end of the plunger. Contact of the pin 68 with this screw effects the return stroke drive of the plunger, the pin being fast in the cross-head; and the forward drive is caused by encounter of the pin with the end of the slot 9^c. The variable amount of "lost motion" thus obtained affords a means of adjusting the relative timing of the wire feed and the depression of the holder in position to receive the wire. This means makes possible a more accurate timing of these movements than could be secured if they depended solely upon the accuracy of construction of the parts.

I claim:—

1. In a button-attaching machine, a button-holder; a button-delivery chute; a cross-head mounted for reciprocation; a button-controller arm mounted for reciprocation toward and from the holder and having a notched portion overhanging the end of the chute in position for engaging a button; an abutment on the cross-head positioned for engaging the controller arm and moving it toward the holder during the advance of the cross-head; means for feeding the button into the chute, and means for reciprocating the cross-head.

2. In a button-attaching machine, a button-holder; a button-delivering chute; a cross-head mounted for reciprocation toward and from the holder; a button-controller arm mounted for reciprocation toward and from the holder and fulcrumed between its ends; said arm having a notched portion overhanging the chute in position for engaging a button; an abutment on the cross-head positioned for engaging the controller arm at one end and moving it toward the holder during the advance of the cross-head, the other end of the arm being adapted for contact with the holder; means for retracting the holder; yielding means for causing the arm to follow the holder in its retraction and to tilt out of engagement with the abutment on the cross-head; means for feeding buttons into the chute, and means for reciprocating the cross-head.

3. In a button-attaching machine, a button-holder, a button-delivery chute; a cross-head mounted for reciprocation; a button controller arm fulcrumed between its ends and having one end notched for engaging a button and overhanging the chute in position for such engagement, said arm having a cam portion at the other end; a roller positioned on the cross-head for encounter with the cam end of the arm for depressing it and raising the notched end out of engagement with a button; means for feeding buttons to the chute, and means for reciprocating the cross-head.

4. In a button-attaching machine, a button-holder; a button-delivery chute; a cross-head mounted for reciprocation; a button controller arm mounted for reciprocation toward and from the holder and fulcrumed between its ends, said arm having one end notched for engaging a button and overhanging the chute in position for such engagement; said arm having a cam portion at the other end; an abutment on the cross-head positioned for engaging the controller arm for moving it toward the holder during the advance of the cross-head; a roller on the cross-head positioned for encounter with the cam end of the arm for depressing it and raising the notched end out of engagement with a button, the cam having a hollow in its contour shaped for engagement of the roller for the retraction of the arm during the return of the cross-head; means for feeding buttons to the chute, and means for reciprocating the cross-head.

5. In a button-attaching machine, a button-holder; a button-delivery chute; a cross-head mounted for reciprocation; a button controller arm fulcrumed between its ends and having one end notched for engaging a button and overhanging the chute in position for such engagement, said arm having a cam portion at the other end; a roller positioned on the cross-head for encounter with the cam end of the arm for depressing it and raising the notched end out of engagement with a button; a spring yieldingly resisting such movement of the arm and adapted to return said arm to its button-engaging position; means for feeding buttons to the chute, and means for reciprocating the cross head.

6. In a button-attaching machine, a button-holder; a button-delivery chute; a cross-head mounted for reciprocation; a button controller arm fulcrumed between its ends and having one end notched for engaging a button and overhanging the chute in position for such engagement, said arm having a cam portion at the other end; a roller positioned on the cross-head for encounter with the cam end of the arm for depressing it and raising the notched end out of engagement with a button; a spring yieldingly resisting such movement of the arm, and adapted to return said arm to its button-engaging position; a spring-cushioned guide for the arm positioned to ease its engagement of a button; means for feeding buttons to the chute, and means for reciprocating the cross-head.

7. In a button-attaching machine, a hammer plunger mounted for reciprocation and a cross-head thereon; a button-holder positioned in the path of said plunger; a second plunger connected to the cross-head; a button holder actuator having a projection protruding in the path of said second plunger, and means for actuating the cross-head.

8. In a button-attaching machine, a hammer plunger mounted for reciprocation; a cross-head connected therewith; a button-holder positioned in the path of said hammer plunger; a button controller; an abutment on the cross-head for engaging and moving the controller; a second plunger connected with the cross-head; a button-holder actuator having a projection in the path of the second plunger, and means for actuating the cross-head.

9. In a button-attaching machine, a button-holder; a cross-head and means for reciprocating it; a trip-operating plunger connected therewith; a lever connected to the holder and positioned to encounter the plunger for moving the holder; a wire-feeding mechanism, and a lever for actuating the same projecting in the path of the plunger, the plunger being connected to the cross-head with a limited range of play with respect to the line of travel; and means for varying the amount of said play.

10. In a button-attaching machine, a button-holder; a cross-head, and means for reciprocating it; a trip-operating plunger and means connecting it to the cross-head permitting limited range of play of the plunger with respect to said cross-head in the line of travel; means for varying the amount of said play; a lever connected to the button-holder and positioned for encounter with the plunger for moving the holder; a wire-feeding mechanism, and an actuating lever therefor, the plunger being formed for positively encountering said actuating lever in both directions of travel of the cross-head.

11. In a button-attaching machine, a button-holder; a cross-head and means for reciprocating it; a trip-operating plunger; means on the cross-head and coöperating means on the plunger for driving the latter, said means being adjustable with respect to the return stroke only; a lever connected to the button-holder and positioned for encounter with the plunger for moving the holder; a pair of abutments on the plunger; a wire-feeding mechanism and lever for actuating the same having one end positioned between the two abutments for encounter therewith.

12. In a button-attaching machine, a button-holder; a cross-head and means for reciprocating it; a trip-operating plunger; a pin fast in the cross-head; the plunger having a slot embracing said pin; a movable stop in the end of the plunger adapted to vary the length of the slot; a lever connected to the button-holder and positioned for encounter with the plunger for moving the holder; a pair of abutments on the plunger; a wire-feeding mechanism and a lever for actuating the same having one end positioned between the two abutments for encounter therewith.

In testimony whereof, I have hereunto set my hand, at Chicago, Illinois, this 13th day of October, 1910.

DAVID C. SASSEMAN.

Witnesses:
ROBT. N. BURTON,
J. ELLIOTT.

---

Copies of this patent may be obtained for five cents each, by addressing the "Commissioner of Patents, Washington, D. C."